TIMING APPARATUS

Filed Aug. 28, 1967 2 Sheets-Sheet 1

Aubrey H. Smith,
Inventor.
Koenig, Senniger, Powers and Leavitt
Attorneys.

TIMING APPARATUS

Filed Aug. 28, 1967 2 Sheets-Sheet 2

United States Patent Office 3,550,117
Patented Dec. 22, 1970

3,550,117

TIMING APPARATUS

Aubrey H. Smith, 6619 Pershing, Kenosha, Wis. 53140

Filed Aug. 28, 1967, Ser. No. 663,588
Int. Cl. G08b 3/00
U.S. Cl. 340—384 11 Claims

ABSTRACT OF THE DISCLOSURE

A highly accurate electronic metronome is disclosed employing two amplifiers, one of which is interconnected to operate as an integrator and the other of which functions as a trigger or switching circuit having precisely defined switching thresholds. The switching amplifier is arranged to provide a first output voltage when the input signal applied thereto exceeds a first predetermined threshold and to provide a second output voltage when the input signal falls below a second predetermined threshold, the second threshold being negative with respect to the first threshold and the first and second output voltages being of substantially equal amplitude and of opposite polarity. The output voltages from the switching amplifier are applied to the integrator amplifier so that the output voltage from the integrator amplifier varies at a substantially constant rate in a direction which depends upon the polarity of the output voltage from the switching amplifier. The output voltage from the integrator amplifier is then applied to the input of the switching amplifier so that a condition of instability exists and oscillations at precisely predetermined regular periods are produced. These oscillations are employed to trigger a one-shot multivibrator which drives a loudspeaker to produce an audible signal for each such oscillation. The repetition rate is adjustable over a range making the apparatus suitable for use as a metronome.

BACKGROUND OF THE INVENTION

This invention relates to timing apparatus and more particularly to an electronic metronome.

While various electronic metronome circuits have been proposed previously, these circuits have typically not been particularly accurate or precise in operation but rather have been affected by changes in supply voltage, etc.

SUMMARY OF THE INVENTION

Among the several object of the present invention may be noted the provision of a highly accurate electronic timing apparatus; the provision of such apparatus which provides oscillations having precisely predetermined periods; the provision of such apparatus in which the period of oscillation is not substantially affected by changes in supply voltage; the provision of such apparatus in which the period of oscillation is readily adjustable over a substantial range; the provision of a precise electronic metronome; the provision of such a metronome which is reliable, simple and economical. Other objects and features will be in part apparent and in part pointed out hereinafter.

Briefly, timing apparatus according to this invention involves a first amplifying means having an input terminal and an output terminal, the output terminal providing an output signal which is amplified and out-of-phase with respect to an input signal applied to the input terminal. A capacitor connects the output terminal to the input terminal thereby to provide at the output terminal a signal which varies as a function of the time integral of a current applied to the input terminal. The apparatus also includes switching means providing a first output voltage when the output signal from the first amplifying means exceeds a first predetermined threshold and for providing a second output voltage when the output signal from the first amplifying means falls below a second predetermined threshold. The second threshold is negative with respect to the first threshold and the first and second output voltages are of substantially equal amplitude and of opposite polarity. The output voltage provided by the switching means is applied, through means including a resistor, to the input terminal of the first amplifying means thereby to apply to that input terminal a current of predetermined amplitude which flows in one direction when the one output voltage is provided and which flows in the opposite direction when the second output voltage is provided. Accordingly, the voltage of the output signal from the amplifying means changes at a substantially constant rate and reverses direction of change at substantially uniform intervals.

In one aspect of this invention, the output voltage from the sitching means is employed to trigger a monostable multivibrator which drives a loudspeaker to provide an audible signal thereby rendering the apparatus useful as a metronome.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
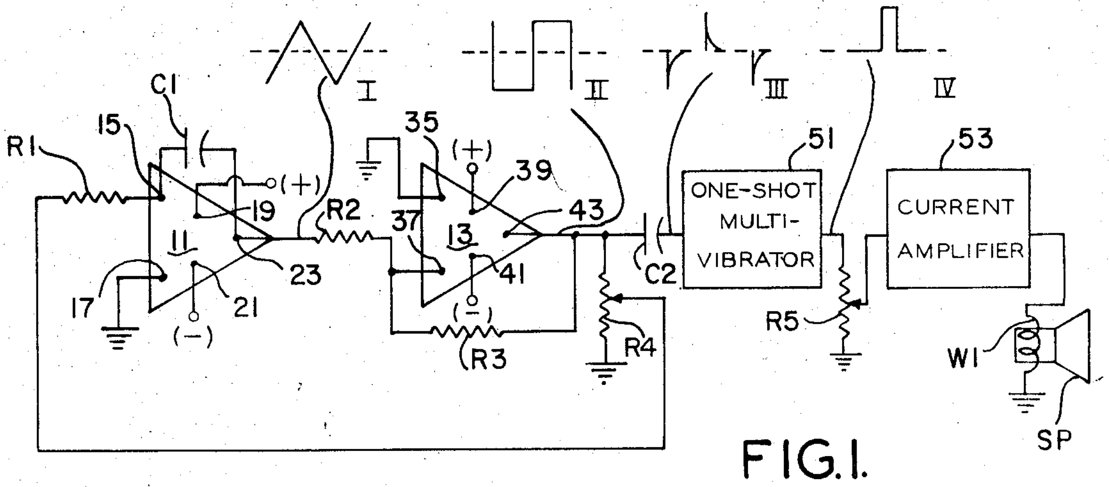
FIG. 1 is a block diagram illustrating a metronome according to the present invention.

Referring now to FIG. 1, the timing apparatus illustrated there includes a pair of high gain differential amplifiers 11 and 13. Amplifiers 11 and 13 may, for example, be of the type known as "operational amplifiers" which comprise high gain, direct-coupled transistor amplifiers readily available from various commercial sources. Amplifier 11 includes a pair of differential input terminals 15 and 17, positive and negative supply terminals 19 and 21, respectively, and an output terminal 23. As is understood by those skilled in the art, the voltage provided at output terminal 23 varies as a function of the difference between the voltages applied at the input terminals 15 and 17, the output voltage becoming more positive as the terminal 17 is driven in a positive sense with respect to terminal 15. The output signal is thus out-of-phase with respect to an input signal applied to terminal 15 and thus negative feedback around the amplifier may be provided by a connection between the output terminal 23 and the input terminal 15. Amplifier 13 is essentially identical with amplifier 11 and includes respective input terminals 35 and 37, positive and negative supply terminals 39 and 41, respectively, and an output terminal 43. Supply voltages of equal amplitude and of opposite polarities are applied to the respective supply terminals of each amplifier.

A capacitor C1 is connected between the output terminal 23 and the input terminal 15 of amplifier 11. As is understood by those skilled in the art, this connection causes amplifier 11 to function as an integrator so that the output signal provided at terminal 23 of amplifier 11 varies as a function of the time integral of a current applied to the respective input terminal 15. One end of a resistor R1 is connected to input terminal 15 of amplifier 11 and the other input terminal 17 is connected to ground. The rate at which the capacitor C1 charges thus varies as a function of the voltage which is applied to the other end of resistor R1 with respect to ground.

The output signal provided by amplifier 11 is applied to the input terminal 37 of amplifier 13 through a resistor R2. The output voltage from terminal 43 of amplifier 13 is also applied to the in-phase input terminal 37 through a resistor R3 thereby to provide regenerative or positive feedback around amplifier 13. The voltage applied to input terminal 37 thus varies as a function of the output voltages of both amplifiers 11 and 13. The input terminal 35 is connected to ground. As is understood by those skilled in the art, the regenerative feedback provided around amplifier 13 through resistor R3 causes it to be unstable and to operate in a switching mode. When the output signal from amplifier 11 passes above a predetermined positive threshold, amplifier 13 assumes a first state in which the output voltage provided at the terminal 43 is substantially equal to the positive supply voltage. Conversely, when the output voltage from amplifier 11 falls below a predetermined negative threshold, amplifier 13 assumes a second state in which the output voltage provided at terminal 43 is substantially equal to the negative supply voltage. The values of the thresholds are determined essentially by the relative values of resistors R2 and R3 since, except for a slight so-called hysteresis caused by the slight drive voltage required by amplifier 13, the output voltage from amplifier 13 switches substantially when the voltage applied to terminal 37 passes that at terminal 35, i.e., ground potential. Since the two output voltages provided by amplifier 13 are of substantially equal magnitude though of opposite polarity, it can be seen that the thresholds are at voltage levels which are also substantially equal but of opposite polarity except for the slight drive voltage required by amplifier 13. Typically, this drive voltage may be in the order of 1.0 millivolt as compared with supply voltages of plus and minus 3 volts.

The output voltage from amplifier 13 is applied across a potentiometer R4 and a portion of the output voltage, taken from the movable tap of potentiometer R4, is applied to the integrator amplifier 11 through the resistor R1. From the previous explanation of the operation of the integrator and amplifier 11, it can be seen that this application of a portion of the output voltage from the switching amplifier 13 causes the capacitor C1 to charge and the output signal at terminal 23 of amplifier 11 to change at a rate which is preselectable by adjustment of potentiometer R4. As a positive output voltage from the switching amplifier 13 causes the output signal from the amplifier 11 to change in a negative direction due to charging of capacitor C1, it can be seen that the affect of this charging is to eventually switch the amplifier 13 to its opposite state. Similarly, when the switching amplifier 13 is providing a negative output signal, the output signal from the integrating amplifier 11 changes in a positive direction which eventually also reverses the state of the switching amplifier 13. Accordingly, a condition of instability exists and the output voltage provided by switching amplifier 13 continually switches back and forth between the positive and negative supply voltages. This waveform is represented at II in FIG. 1. The waveform produced at the output terminal of amplifier 11 by the charging and discharging of capacitor C1 is represented at I in FIG. 1. This waveform changes voltage at a substantially constant rate due to the integrating effect of amplifier 11 and reverses direction of change at substantially uniform intervals when the switching amplifier 13 changes states. Since the rate at which capacitor C1 is charged determines how long it takes to reach either of the thresholds of the switching amplifier 13, the period or frequency of the oscillations may be adjusted by varying the setting of potentiometer R4 which determines the amplitude of the current flow through resistor R1.

The switching transients in the switching waveform II are applied, through a coupling capacitor C2, to a one-shot multivibrator indicated generally at 51, the triggering waveform being indicated at III in FIG. 1. The multivibrator circuit 31 is triggered by the positive-going portions of the waveform III to generate, in a manner understood by those skilled in the art, a pulse of predetermined duration as indicated at IV in FIG. 1. The output signal from multivibrator 51 is applied across a potentiometer R5 and a preselected portion of this pulse, taken from the movable tap of potentiometer R5, is applied to a current amplifier indicated generally at 53. Amplifier 53 applies the pulse waveform, at an appropriate current level, to the voice coil W1 of a loudspeaker indicated generally at SP. Accordingly, an audio pulse or signal is generated for each cycle of oscillation of the timing apparatus comprising amplifiers 11 and 13. Other types of transducers may be used in place of the loudspeaker shown. The relative values of capacitor C1 and resistor R1 are chosen so that the range of frequencies available by adjusting potentiometer R4 is appropriate for enabling the apparatus to be employed as a metronome.

Figure 2:
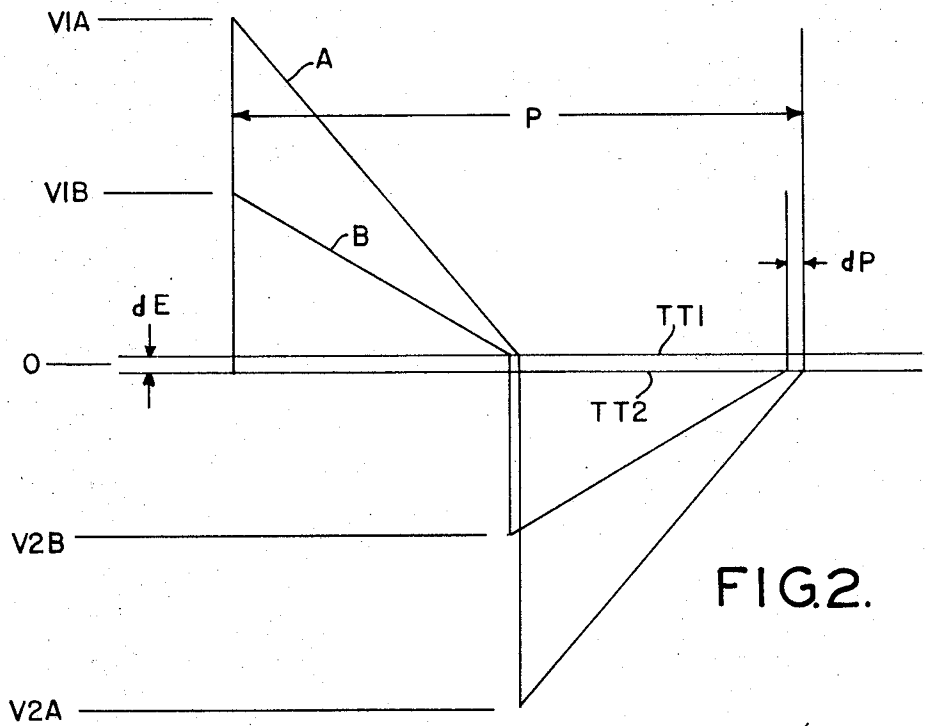
FIG. 2 comprises a series of traces which represent waveforms generated by the metronome of FIG. 1 under two different supply voltage conditions and which illustrate the stability of the metronome.

The effect of changes in supply voltage on the period of this metronome is illustrated in FIG. 2. The traces represent the behavior of the voltage appearing at the input terminal 37 of amplifier 13 under different supply voltage conditions. Curve A represents the behavior of this voltage when supply voltages of full magnitude are present. At the start of a cycle, that is, when the output voltage from the switching amplifier 13 has just switched to its positive level, the input voltage terminal 37 of amplifier 13 rises to a value V1A determined by the relative values of resistors R2 and R3. As this positive output voltage from amplifier 13 causes capacitor C1 to charge in a sense which lowers the output voltage from amplifier 11, the input voltage at terminal 37 of amplifier 13 falls correspondingly until it reaches a level TT1 at which it no longer provides sufficient drive to amplifier 13 to maintain the full positive voltage at the output terminal 43. At this point, regeneration from the output to the input of amplifier 13 through resistor R3 causes the input voltage to shift abruptly to a negative level V2A, which negative level is again determined by the relative values of resistors R2 and R3. The negative output voltage provided by amplifier 13 then causes capacitor C1 to charge in the opposite direction thereby causing the output signal from amplifier 11 to change in a more positive direction and to thereby also raise the input voltage applied to the terminal 37 of amplifier 13. The input voltage rises until it reaches a level TT2 at which it drives amplifier 13 to raise its output voltage. At this point the regenerative feedback provided through resistor R3 takes over and causes amplifier 13 to switch abruptly to its positive output state thereby restarting the cycle. The levels TT1 and TT2 are separated by a voltage *d*E which is a function of the drive required by amplifier 13.

If the input voltages are halved the behavior of this circuit is as represented by trace B. Although the input voltage to amplifier 13 changes at a slower rate after starting from a lower peak level V1B, it reaches level TT1 somewhat earlier than the trace A. Similarly, the negative going portion of trace B also takes a shorter length of time returning from its peak V2B than the corresponding portion of the trace A thereby resulting in an overall difference between the total periods as indicated at *d*P. A typical value for *d*E is 1.0 millivolt and if, for example, it is assumed that the full or normal supply voltages are plus and minus 3 volts as noted previously, the change in the period for halving the supply voltage can be calculated to be about 0.0167%. Accordingly, it can be seen that a very stable and reliable time base is established which is eminently suitable for enabling this apparatus to be used as a precision metronome.

Figure 3:
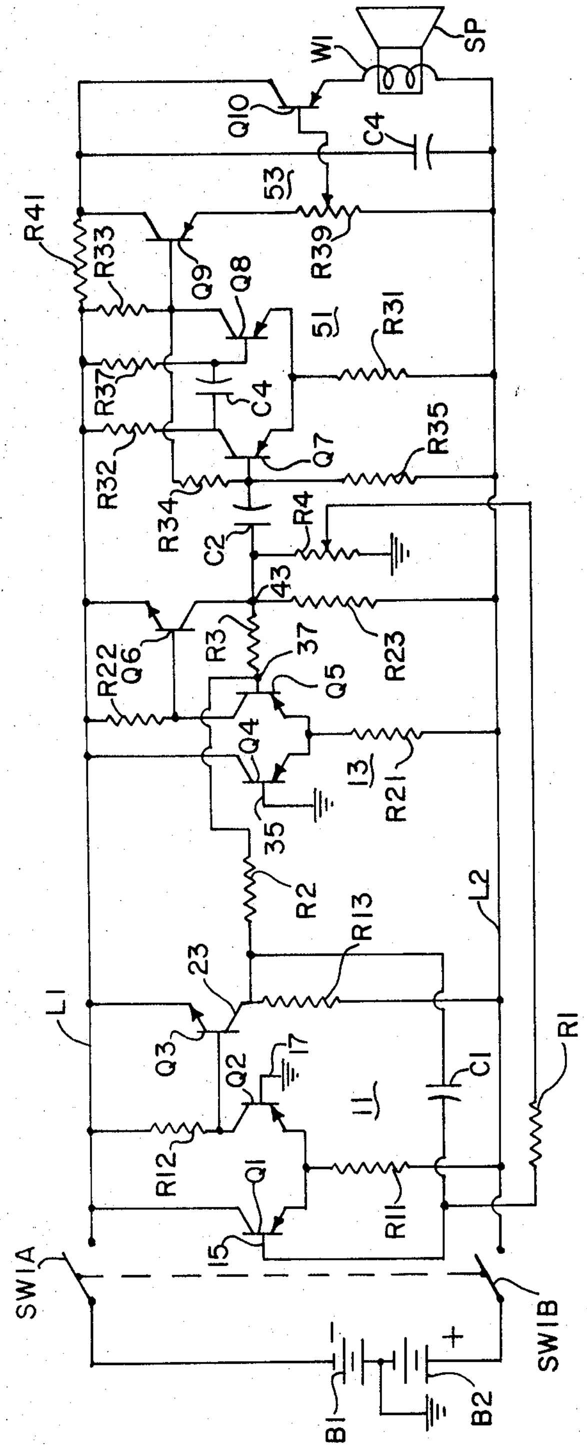
FIG. 3 is a schematic circuit diagram of the metronome of FIG. 1.

A particular construction employing discrete components is illustrated in FIG. 3. It should be understood that so-called integrated circuits may also be employed. A pair of batteries B1 and B2 are connected between ground and respective supply leads L1 and L2 by means of a double-pole switch having sections SW1A and SW1B thereby to provide to these leads voltages which are equal but of opposite polarity with respect to ground. Amplifier 11 comprises two PNP transistors Q1 and Q2 and an NPN transistor Q3. The emitters of transistors Q1 and Q2 are connected together and to ground through a common resistor R11. The collector of transistor Q1 is connected directly to supply lead L1 and the collector of transistor Q2 is connected to the same supply lead through a load resistor R12. The collector of transistor Q2 is coupled directly to the base of transistor Q3. The emitter of transistor Q3 is connected to lead L1 and its collector is connected to lead L2 through a load resistor R13. The collector of transistor Q3 constitutes the output terminal 23 of amplifier 11 and is connected through capacitor C1 to the base of transistor Q1 which comprises the input terminal 15 of the amplifier. The base of transistor Q2, which constitutes the input terminal 17 of amplifier 11, is grounded.

Amplifier 13 comprises two PNP transistors Q4 and Q5 and an NPN transistor Q6. The emitters of transistors Q4 and Q5 are connected together and to lead L2 through a common resistor R21. The collector of transistor Q4 is connected directly to lead L1 and the collector of transistor Q5 is connected to that lead through a load resistor R22. The collector of transistor Q5 is also coupled directly to the base of transistor Q6. The emitter of transistor Q6 is connected to lead L1 and its collector is connected to lead L2 through a load resistor R23. The base of transistor Q4 which constitutes the input terminal 35 of the amplifier 13 is grounded and the base of transistor Q5 which constitutes the other input terminal 37 is connected, through resistor R2, to the output terminal 23 of integrating amplifier 11 as described previously and, through resistor R3, to the collector of transistor Q6 which constitutes the output terminal 43 of amplifier 13. The output signal from amplifier 13 is also applied across potentiometer R4 as described previously and the movable tap of this potentiometer is connected, through resistor R1, to the input terminal 15 of amplifier 11.

The one-shot multivibrator 51 comprises a pair of PNP transistors Q7 and Q8. The emitters of transistors Q7 and Q8 are connected together and to lead L2 through a common resistor R31. The collectors of transistors Q7 and Q8 are connected to lead L1 through respective load resistors R32 and R33. The collector of transistor Q8 is connected to the base of transistor Q7 through a network comprising a pair of resistors R34 and R35 to provide regenerative coupling and the collector of transistor Q7 is connected to the base of transistor Q8 through a timing capacitor C4. Transistor Q8 is normally forward biased by a resistor R37 connecting its base to lead L1. As is understood by those skilled in the art when a positive pulse is applied to the base of transistor Q7, this transistor conducts and transistor Q8 is cut off for a period effectively determined by the relative values of capacitor C4 and resistor R37. A positive-going, square-topped pulse is thus generated at the collector of transistor Q8. The output signal from amplifier 13 is applied to the base of transistor Q7 through capacitor C2 as decribed previously so that multivibrator 31 is triggered each time the output signal from amplifier 13 switches to its positive level.

The pulse generated at the collector of transistor Q8 is applied directly to the base of a PNP transistor Q9 which is operated as an emitter follower. The signal thereby provided at the emitter of transistor Q9 is applied across a potentiometer R39 and the signal provided at preselected amplitude at the movable tap of potentiometermeter 39 is applied to the base of a transistor Q10 which is also operated as an emitter follower. The collectors of transistors Q9 and Q10 draw current from lead L1 to a current limiting resistor R41. The collectors of transistors Q9 and Q10 are shunted to lead L2 by a filter capacitor C4. The transistors Q9 and Q10 constitute the current amplifier 53 and the output signal available at a relatively high current level at the emitter of transistor Q10 is applied to the voice coil W1 of loudspeaker SP as described previously to produce an audible click for each cycle of oscillation of the integrating and switching amplifiers. The loudness of this audible signal may be adjusted by varying the setting of potentiometer R39. As noted previously the frequency at which these audible signals are produced can be adjusted by means of potentiometer R4 which controls the rate of charging of capacitor C1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Timing apparatus comprising:

first amplifying means having an input terminal and an output terminal, said output terminal providing an output signal which is amplified and out-of-phase with respect to an input signal applied to said input terminal;

means including a capacitor connecting said output terminal to said input terminal thereby to provide at said output terminal a signal which varies as a function of the time integral of a current applied to said input terminal;

switching means for providing a first output voltage when the output signal from said first amplifying means exceeds a first predetermined threshold and for providing a second output voltage when the output signal from said first amplifying means falls below a second predetermined threshold, said second threshold being negative with respect to said first threshold, said first and second output voltages being of substantially equal amplitude and of opposite polarity; and means including a resistor connecting the output voltage provided by said switching means to the input terminal of said amplifying means thereby to apply to said input terminal a current of predetermined amplitude which flows in one direction when said one output voltage is provided and which flows in the opposite direction when said second output voltage is provided, whereby said amplifying and switching means oscillate and the voltage of the output signal from said amplifying means changes at a substantially constant rate and reverses direction of change at substantially uniform intervals.

2. Timing apparatus as set forth in claim 1 wherein said switching means includes a second amplifying means having an input terminal and an output terminal, the last said output terminal providing an output signal which is amplified and in-phase with respect to an input signal applied to the input terminal of said second amplifying means and wherein said switching means includes also means for applying a voltage which varies as a function of the output signals of both of said amplifying means to the input terminal of said second amplifying means.

3. Timing apparatus as set forth claim 2 wherein said means for connecting the output voltage provided by said switching means to the input terminal of said amplifying means includes a potentiometer whereby the rate of charging of said capacitor may be varied thereby to vary the frequency of oscillation of said apparatus.

4. Timing apparatus as set forth in claim 2 wherein said first and second amplifying means comprise high gain, direct-coupled transistor amplifiers.

5. Timing apparatus as set forth in claim 4 wherein said amplifiers are of the differential input type.

6. Timing apparatus as set forth in claim 1 including means for providing an audible signal for each cycle of oscillation of said switching means.

7. Timing apparatus as set forth in claim 6 wherein said means for providing an audible signal includes a one-shot multivibrator and a transducer controlled by said multivibrator.

8 Timing apparatus as set forth in claim 7 wherein said transducer is a loudspeaker.

9. Timing apparatus as set forth in claim 8 including a current amplifier for driving said loudspeaker from said multivibrator.

10. Timing apparatus as set forth in claim 7 including a capacitor for coupling switching transients in the output voltage provided by said switching means to said multivibrator thereby to trigger said multivibrator to generate said audible signal.

11. A metronome comprising:

first amplifying means having an input terminal and an output terminal, said output terminal providing an output signal which is amplified and out-of-phase with respect to an input signal applied to said input terminal;

means including a capacitor connecting said output terminal to said input terminal thereby to provide at said output terminal a signal which varies as a function of the time integral of a current applied to said input terminal;

a second amplifying means having an input terminal and an output terminal, the last said output terminal providing an output signal which is amplified and in-phase with respect to an input signal applied to the input terminal of said second amplifying means;

means for applying a voltage which varies as a function of the output signals of both of said amplifying means to the input terminal of said second amplifying means thereby to provide a first output voltage from said second amplifying means when the output signal from said first amplifying means exceeds a first predetermined threshold and for providing a second output voltage when the output signal from said first amplifying means falls below a second predetermined threshold, said second threshold being negative with respect to said first threshold, said first and second output voltages being of substantially equal amplitude and of opposite polarity;

means including a resistor connecting the output voltages provided by said second amplifying means to the input terminal of said first amplifying means thereby to apply to said input terminal a current of predetermined amplitude which flows in one direction when said first output voltage is provided and which flows in the opposite direction when said second output voltage is provided;

a one-shot multivibrator;

means for triggering said multivibrator when said second amplifying means switches from said first output voltage to said second output voltage; and a transducer controlled by said multivibrator for providing an audible signal when said multivibrator is triggered whereby said first and second amplifying means oscillate and said transducer provides said audible signal during each oscillation cycle.

References Cited

UNITED STATES PATENTS

| | | | |
|---|---|---|---|
| 3,144,564 | 8/1964 | Sikorra | 330—99X |
| 3,180,199 | 4/1965 | Anderson | 58—130X |

ALVIN H. WARING, Primary Examiner

M. SLOBASKY, Assistant Examiner

U.S. Cl. X.R.

84—484; 58—130; 330—98, 99, 100